United States Patent
Sawada (10) Patent No.: US 11,975,226 B2
(45) Date of Patent: May 7, 2024

(54) FUEL STORAGE DEVICE

(71) Applicant: TOYOTA JIDOSHA KABUSHIKI KAISHA, Toyota (JP)

(72) Inventor: Yutaka Sawada, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 524 days.

(21) Appl. No.: 17/164,910

(22) Filed: Feb. 2, 2021

(65) Prior Publication Data

US 2021/0244981 A1 Aug. 12, 2021

(30) Foreign Application Priority Data

Feb. 12, 2020 (JP) .................................. 2020-021493

(51) Int. Cl.
| | |
|---|---|
| *A62C 3/06* | (2006.01) |
| *B60K 15/03* | (2006.01) |
| *H01M 8/04082* | (2016.01) |
| *B60L 50/72* | (2019.01) |

(52) U.S. Cl.
CPC .............. *A62C 3/065* (2013.01); *B60K 15/03* (2013.01); *H01M 8/04201* (2013.01); *B60K 2015/03151* (2013.01); *B60L 50/72* (2019.02)

(58) Field of Classification Search
CPC ...................... A62C 3/065; B60K 15/03; B60K 2015/03151; H01M 8/04201; B60L 50/72
USPC .......................................................... 169/57
See application file for complete search history.

(56) References Cited

U.S. PATENT DOCUMENTS

| | | | | | |
|---|---|---|---|---|---|
| 3,213,821 | A | * | 10/1965 | Godwin ..................... | B60F 3/00 114/344 |
| 3,430,647 | A | * | 3/1969 | Suchowolec ......... | F17C 13/123 137/543.17 |
| 5,309,972 | A | * | 5/1994 | Thomas ............. | B60H 1/00364 160/90 |
| 6,367,573 | B1 | * | 4/2002 | Scott ...................... | B60K 15/07 180/69.5 |
| 2004/0026427 | A1 | * | 2/2004 | Shigematsu ........... | B60K 15/07 220/562 |
| 2008/0156809 | A1 | | 7/2008 | Mizuno et al. | |

FOREIGN PATENT DOCUMENTS

| | | |
|---|---|---|
| CN | 101102914 A | 1/2008 |
| JP | 2006188169 A | 7/2006 |

* cited by examiner

*Primary Examiner* — Chee-Chong Lee
(74) *Attorney, Agent, or Firm* — Dickinson Wright, PLLC (57) ABSTRACT

To suppress the influence of gas on other fuel tanks when the gas is discharged from a fuel tank. A fuel storage device includes: a plurality of fuel tanks, each having a fusible plug valve; a support member that supports the plurality of fuel tanks, while making longitudinal directions of the respective fuel tanks parallel to each other; and a blocking member that blocks at least part of the fuel gas discharged from the fusible plug valves. The plurality of fuel tanks includes a tank group including the plurality of fuel tanks aligned along a first direction and a juxtaposed tank thereto. The blocking member is disposed between the tank group and the juxtaposed tank. The orientations of openings of the fusible plug valves included in blocked tanks are directed toward the blocking member, the blocked tanks being two or more fuel tanks that are continuous in the first direction, among the fuel tanks included in the tank group.

6 Claims, 6 Drawing Sheets

FUEL STORAGE DEVICE

CROSS REFERENCE TO RELATED APPLICATIONS

This application claims priority to Japanese Patent Application No. 2020-021493, filed Feb. 12, 2020, the disclosure of which is incorporated by reference herein in its entirety.

BACKGROUND

Field

The present disclosure relates to a fuel storage device used with a plurality of fuel tanks installed therein.

Related Art

Conventionally, as a method of mounting a fuel tank on a vehicle, there is proposed a configuration in which the fuel tank is mounted so that a valve structure serving as an inlet/outlet for gas fuel in the fuel tank is placed away from a passenger entrance/exit of the vehicle while setting the longitudinal direction of the fuel tank to the left-right direction of the vehicle (see, for example, JP-A-2006-188169). This suppresses the influence of the gas fuel on the entrance/exit when it is discharged from the valve structure.

Patent Literature 1: JP-A-2006-188169

However, in the case of installing a plurality of fuel tanks, no consideration is given to the influence of gas on the other fuel tanks when the gas is discharged from each fuel tank.

SUMMARY

In one aspect of the present disclosure, a fuel storage device is provided. The fuel storage device includes, a plurality of fuel tanks configured to store fuel gas, each of the fuel tanks having a fusible plug valve from which the fuel gas is discharged under a predetermined high temperature condition; a support member configured to support the plurality of fuel tanks, while making longitudinal directions of the respective plurality of fuel tanks parallel to each other and setting an orientation of an opening of the fusible plug valve provided in each of the fuel tanks, in a predetermined direction; and a blocking member configured to block at least part of the fuel gas discharged from the fusible plug valve. The plurality of fuel tanks includes, a tank group including the plurality of fuel tanks aligned along a first direction perpendicular to the longitudinal direction as viewed in the longitudinal direction; and a juxtaposed tank arranged to be aligned in a second direction different from the first direction with respect to any of the fuel tanks included in the tank group. The blocking member is disposed between the tank group and the juxtaposed tank. The orientations of the openings of the fusible plug valves included in blocked tanks are directed toward the blocking member, the blocked tanks being two or more of the fuel tanks included in the tank group and being continuously arranged in the first direction.

DETAILED DESCRIPTION

Figure 1:
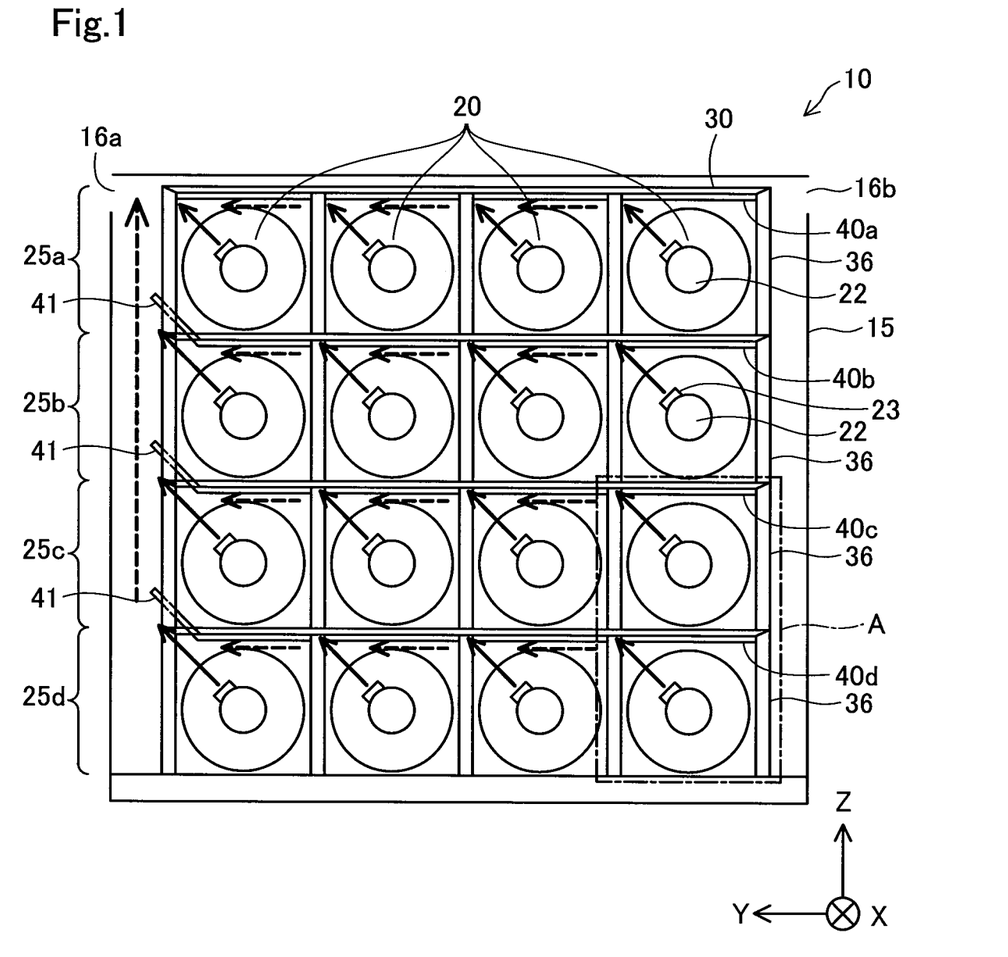
FIG. 1 is an explanatory diagram illustrating a schematic configuration of a fuel storage device.
Figure 2:
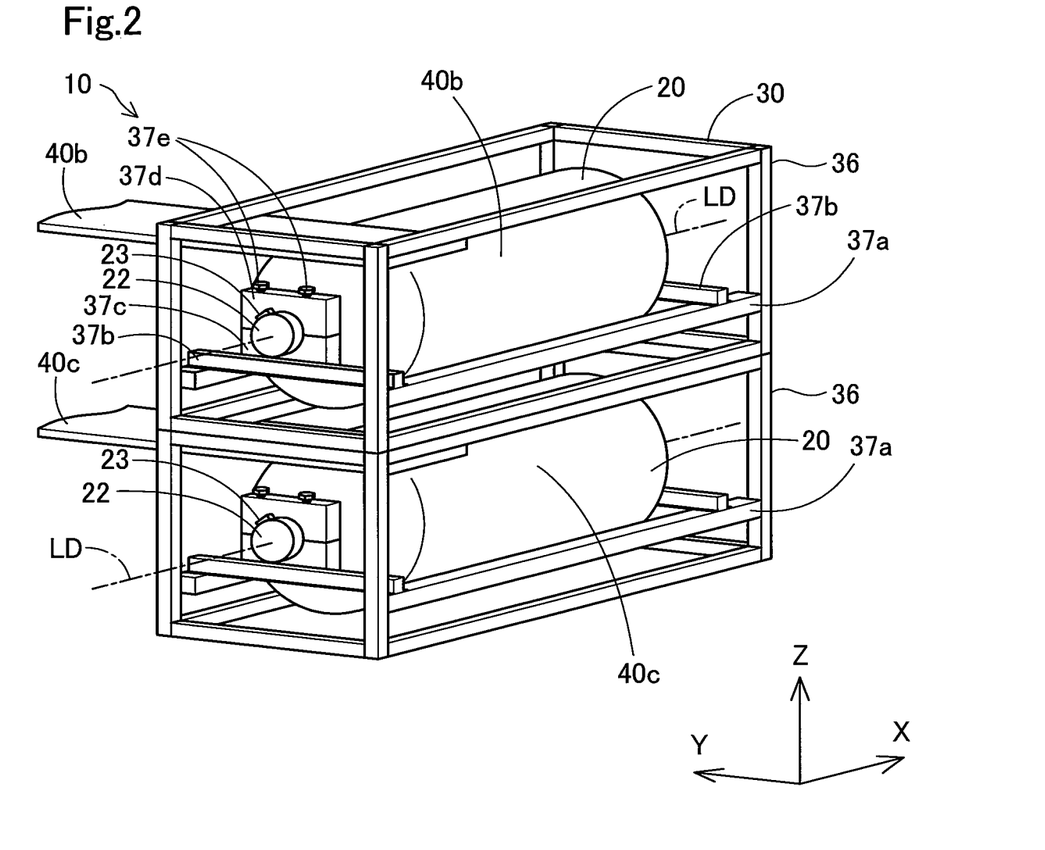
FIG. 2 is an enlarged perspective view illustrating a part of the fuel storage device.

A. First Embodiment :

(A-1) Entire Configuration of Device:

FIG. 1 is an explanatory diagram illustrating a schematic configuration of a fuel storage device 10 as a first embodiment of the present disclosure. FIG. 2 is an enlarged perspective view illustrating a part of the fuel storage device 10. FIGS. 1 and 2 illustrate the arrows indicative of the X direction, Y direction, and Z direction which are orthogonal to each other in order to show the correspondence between FIGS. 1 and 2. The Z direction is also referred to as the vertical direction. In FIG. 1, a region corresponding to FIG. 2 is indicated as a region A by the single-dotted line. Hereinafter, the configuration of the fuel storage device 10 will be described in detail with reference to FIGS. 1 and 2. In a stationary power supply apparatus on which a fuel cell (not illustrated) is mounted, the fuel storage device 10 of the present embodiment is provided to supply hydrogen as fuel gas to the fuel cell. The stationary power supply is usable for a variety of applications, such as those for domestic or industrial use. The fuel storage device 10 includes a plurality of fuel tanks 20, a support member 30 that supports the fuel tanks 20, blocking members 40a to 40d, and a storage member 15.

The fuel tank 20 is a tank that stores hydrogen, which is fuel gas. In the present embodiment, the plurality of fuel tanks 20 included in the fuel storage device 10 each has the same structure. The fuel tank 20 may be, for example, a resin tank which includes a resin liner as a casing for storing high-pressure hydrogen, and a fiber reinforced plastic (FRP) layer as a reinforcing layer formed on the outer surface of the resin liner by winding a fiber containing a thermosetting resin. The FRP layer may include, for example, a layer containing Carbon Fiber Reinforced Plastic (CFRP). Such an FRP layer may be formed by a filament winding method.

Figure 3:
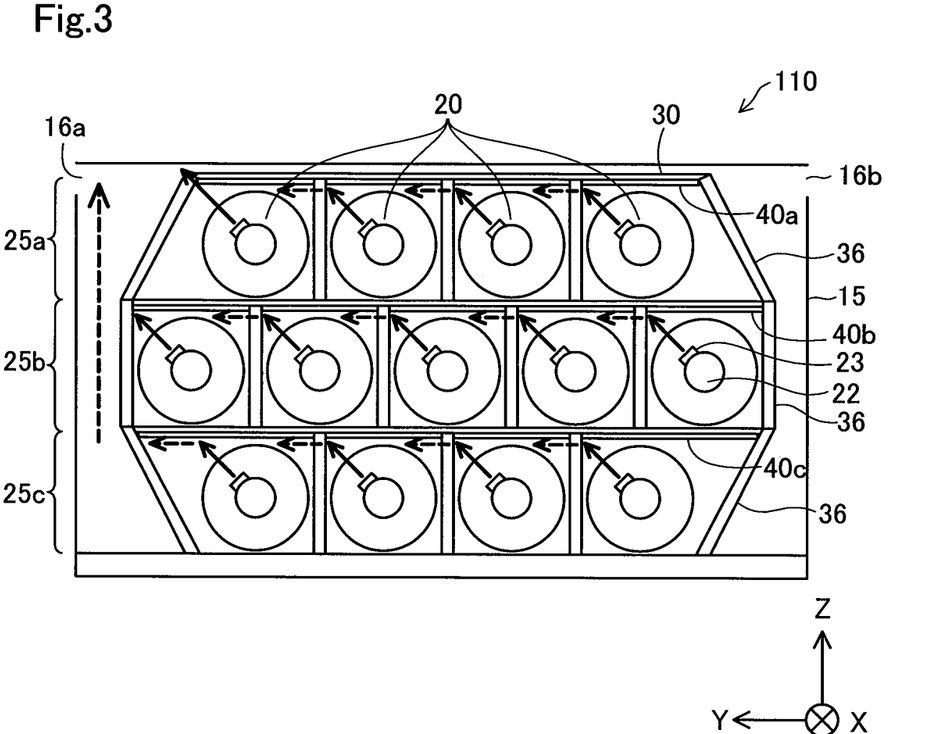
FIG. 3 is an explanatory diagram illustrating a schematic configuration of a fuel storage device.

As illustrated in FIG. 2, each fuel tank 20 has a shape with a substantially hemispherical portion provided on each of both ends of a cylindrical portion. A mouthpiece 22 is provided at each of both ends of the fuel tank 20 in its longitudinal direction LD (which is the direction along the center axis of each fuel tank 20, i.e., the X direction illustrated in FIGS. 1 and 2). FIGS. 2 and 3 represent only one of a pair of mouthpieces 22. One of the mouthpieces 22 is provided therein with a filling flow path, a discharge flow path, and a valve mechanism that adjusts the flow state of these flow paths. When the fuel tank 20 is filled with hydrogen, the hydrogen flows through the filling flow path. When the hydrogen is discharged from the fuel tanks 20 to the outside of the fuel tanks 20, the hydrogen flows through the discharge flow path. The valve mechanism includes a fusible plug valve 23 that opens under a predetermined high temperature condition to discharge the fuel gas from the fuel tank 20. FIGS. 1 and 2 illustrate the position of the fusible plug valve 23 in one of the mouthpieces 22. The fusible plug valve 23 of the present embodiment discharges hydrogen when the temperature of the fusible plug valve 23 is raised to 110° C., but may discharge the hydrogen at different temperatures. FIGS. 1 and 2 omit the illustration of pipes or the like for the fuel gas, connected to the above-described valve mechanism.

The support member 30 supports the plurality of fuel tanks 20 in a state where the longitudinal directions of the respective fuel tanks 20 are parallel to each other. The support member 30 also supports the plurality of fuel tanks 20, while setting the orientation of an opening of the fusible plug valve 23 provided in each fuel tank 20, in a predetermined direction. Specifically, the support member 30 supports the plurality of fuel tanks 20 such that the discharge direction of the fuel gas in the fusible plug valve 23 of each fuel tank 20 is oriented toward a corresponding one of the blocking members 40a to 40d as described below. The term "discharge direction of the fuel gas at the fusible plug valve 23" refers to the direction of the flow path axis in an outlet portion of a fuel gas flow path, including the opening of the fusible plug valve 23, in the valve mechanism of the mouthpiece 22. The discharge direction of the fuel gas in the fusible plug valve 23 may be said to be the direction of the center axis of the flow of the fuel gas which is injected from the fusible plug valve 23.

In the present embodiment, as viewed in the longitudinal direction, the groups of fuel tanks 20, each aligned along a first direction (Y direction) perpendicular to the longitudinal direction, are arranged to be stacked along a second direction (Z direction), which is perpendicular to the longitudinal direction but different from the first direction, and the fuel tanks 20 are supported by the support member As illustrated in FIG. 1, four fuel tanks 20 are arranged to be aligned in the Y direction to form a stage. Such a structure is illustrated to be stacked in four stages in the Z direction. The number of fuel tanks 20 aligned in each of the Y and Z directions may be two or more, but not four.

The support member 30 has a plurality of frame bodies 36. The frame body 36 individually accommodates each fuel tank 20 therein. Each frame body 36 has a framework structure that forms a space therein. The frame body 36 forms a storage space in which the corresponding fuel tank 20 is individually accommodated. More specifically, the frame body 36 has the framework structure constituted of members, each having a shape corresponding to each side of a square pillar. The respective frame bodies 36 are arranged such that the frame bodies 36 aligned in the Z direction coincide with and overlap each other as viewed from the Z direction, while the frame bodies 36 aligned in the Y direction also coincide with and overlap each other as viewed from the Y direction. Each fuel tank 20 is accommodated in the corresponding frame body 36 such that the longitudinal direction of the fuel tank 20 coincides with the longitudinal direction of the frame body 36. Thus, the plurality of fuel tanks 20 included in the fuel storage device 10 is arranged such that their longitudinal directions are parallel to each other. As used herein, the term "longitudinal directions parallel to each other" allows a difference in the angle of 15° or less.

The frame body 36 may be a metal member made of, for example, iron. The frame bodies 36 may be constructed by combining, for example, a solid rod-shaped member(s) formed in a polygonal columnar or cylindrical shape, and/or a hollow pipe-shaped member(s) formed in a prismatic or cylindrical shape. The frame body 36 has enough strength to support the fuel tank 20 and also has heat resistance that is able to maintain the structure supporting the fuel tank 20 even under temperature conditions where the fusible plug valve 23 is opened.

As illustrated in FIG. 2, in the present embodiment, each fuel tank 20 is fixed to the frame body 36 at the pair of mouthpieces 22 each being provided at a corresponding one of both ends of each fuel tank 20. Each frame body 36 includes a pair of first beams 37a that has a shape corresponding to a generatrix extending in the X-direction on each of the side surfaces parallel to the X-Z plane among the side surfaces of the square pillar shape. Further, each frame body 36 includes a pair of second beams 37b that connects opposing ends of the pair of first beams 37a in the vicinity of each of the side surfaces parallel to the Y-Z plane among the side surfaces of the square pillar shape. A first retaining member 37c is fixed to each second beam 37b. The first retaining member 37c and a second retaining member 37d are paired and shaped to form a space capable of sandwiching the mouthpiece 22 therebetween when they are disposed adjacent to each other. The fuel tank 20 may be fixed to the frame body 36 in any orientation by sandwiching the mouthpiece 22 between the first and second retaining members 37c and 37d and fastening the first and second retaining members 37c and 37d with screws 37e. In the present embodiment, the fuel tank 20 is fixed so that the fusible plug valve 23 of the mouthpiece 22 is directed in a specific direction described below. Any other different configurations for fixing the fuel tank 20 in a desired direction with respect to the frame body 36 may be employed instead of the configuration in which the mouthpiece 22 is fixed as illustrated in FIG. 2. For example, a configuration in which a cylindrical body of the fuel tank 20 is fixed may be employed.

Various methods, such as fastening with bolts or welding, may be employed as a fixing method between adjacent frame bodies 36. It is noted that the support member 30 of the present embodiment is formed by combining a plurality of square pillar-shaped frame bodies 36, but it may have a different configuration. For example, a framework structure of the support member 30 may be formed by combining and joining a plurality of rod-shaped members having a length equal to the height of the support member 30 in the Z direction and extending in the Z direction, a plurality of rod-shaped members having a length equal to the length of the support member 30 in the X direction and extending in the X direction, and a plurality of rod-shaped members having a length equal to the length of the support member 30 in the Y direction and extending in the Y direction.

Each of the blocking members 40a to 40d is a plate-shaped member that has its longitudinal direction in the Y direction. The blocking members 40a to 40d are provided one for each of the four frame bodies 36 in a group which are arranged to be aligned in the Y direction. The blocking members 40a to 40d have the same shape as each other. On the +Z direction side (above), the blocking member 40a, the blocking member 40b, the blocking member 40c, and the blocking member 40d are arranged in that order. When the respective blocking members 40a to 40d are not distinguished from one another, they are also referred to simply as a "blocking member 40". Each blocking member 40 is arranged such that one of the largest surfaces of each blocking member 40 is in contact with the upper surface of each frame body 36 from the inside of the frame body 36, and that a side surface of each blocking member 40 extending in its longitudinal direction is in contact with the side surface of each frame body 36 on the side in the −X direction, from the inside of each frame body 36. Each blocking member 40 is provided to extend from one end of the support member 30 to the other end thereof in the Y direction. Thus, each of the blocking members 40 is disposed so as to overlap all fusible plug valves 23 provided in one group of respective fuel tanks over a region from the fuel tank 20 on one end of the group in the Y direction to the fuel tank 20 on the other end thereof, among the group of fuel tanks 20 arranged to be aligned in one line in the Y direction, as viewed in the Z direction. Each of the blocking members 40 has a guide portion 41 formed at its end in the +Y direction while being bent in the +Z direction. However, the guide portion 41 is not essential, and the guide portion 41 may not be provided at the end of each blocking member 40 in the +Y direction.

Among the groups of fuel tanks, each group being composed of four fuel tanks 20 arranged to be aligned in line in the Y direction, a group of fuel tanks corresponding to the blocking member 40a is also referred to as a tank group 25a, a group of fuel tanks corresponding to the blocking member 40b is also referred to as a tank group 25b, a group of fuel tanks corresponding to the blocking member 40c is also referred to as a tank group 25c, and a group of fuel tanks corresponding to the blocking member 40d is also referred to as a tank group 25d (see FIG. 1). When the respective tank groups 25a to 25d are not distinguished from one another, they are also referred to simply as the "tank group 25". Each of the blocking members 40b and 40d among the blocking members 40a to 40d is provided between the two tank groups 25 stacked adjacent to each other.

The blocking member 40 blocks at least part of the discharged fuel gas when the fuel gas is discharged from the fusible plug valve 23 of the fuel tank 20. The blocking member 40 may be formed of, for example, iron, carbon fiber, or a brick. As previously described, the orientation of the opening of the fusible plug valve 23 included in the fuel tank 20 is directed to the blocking member 40 provided for the corresponding tank group 25 to which the fuel tanks 20 belong. No other fuel tank 20 is disposed between the opening of the fusible plug valve 23 included in the above-mentioned fuel tank 20 and the blocking member 40 provided for the corresponding tank group 25 to which this fuel tank 20 belongs. Therefore, when the fusible plug valve 23 of the fuel tank 20 is opened, the fuel gas is discharged therefrom towards the corresponding blocking member 40 described above. At this time, the blocking member 40 blocks at least part of the discharged fuel gas, thereby preventing the discharging fuel gas from overcoming the blocking member 40. In FIG. 1, the direction in which the fuel gas is discharged from the fusible plug valve 23 when the fusible plug valve 23 is opened is indicated by the solid arrow.

As illustrated in FIG. 1, a storage member 15 is a box-shaped case that accommodates a plurality of fuel tanks 20 (16 fuel tanks in the present embodiment), the support member 30 that supports the plurality of fuel tanks 20, and the blocking members 40a to 40d attached to the support member 30. The upper end of the storage member 15 is provided with exhaust ports 16a and 16b. Therefore, the fuel gas discharged from the opened fusible plug valve 23 of the fuel tank 20 in the storage member 15 as well as the fuel gas leaking from a location other than the fusible plug valve 23 in the fuel tank 20 within the storage member 15 can be discharged from the exhaust ports 16a and 16b to the outside of the storage member 15, thereby suppressing an increase in the concentration of the fuel gas in the storage member 15. Since hydrogen is lighter gas than the air, the exhaust ports 16a and 16b of the present embodiment are provided on the upper end of the storage member 15. The storage member 15 may be formed of resin, such as ABS resin.

(A-2) Operation of Fuel Storage Device When Hydrogen is Discharged

Hereinafter, a description will be given on the operation of the fuel storage device when the fusible plug valves 23 are opened due to an increase in the temperature around the fuel storage device 10, thereby discharging the fuel gas from the fuel tanks 20. When the fusible plug valves 23 are opened under a high-temperature environment, the fuel gas is injected in the direction indicated by the solid arrows illustrated in FIG. 1, as previously described. The orientation of the opening of each fusible plug valve 23 is directed to the corresponding blocking member 40, which is provided for each tank group 25 to which the fuel tanks 20 belongs as previously described. Thus, the fuel gas discharged from each fusible plug valve 23 flows along the surface of a corresponding one of the blocking members 40a to 40d after its flow direction is changed by the corresponding one of the blocking members to 40d.

In the present embodiment, in one group of fuel tanks, which constitutes each tank group, the orientations of the openings of the fusible plug valves 23 of the respective fuel tanks 20 are tilted to the same side with respect to the direction perpendicular to the surface of a corresponding one of the blocking members 40a to 40d disposed downstream of the gas flow, as viewed in the X direction. Thus, the flow directions of the fuel gas discharged from the respective fuel tanks in one group are changed to the similar direction by the common blocking member 40, so that the fuel gas from the respective tanks can flow along the blocking member 40 without having the flows of the fuel gas interrupting each other. FIG. 1 illustrates, by the dashed arrows, the state in which the flow directions of the fuel gas discharged from the respective fuel tanks 20 are changed on the surfaces of the blocking members 40a to 40d. When the fuel gas flowing along the surfaces of the blocking members 40a to 40d in this way reaches the respective ends of the blocking members, the fuel gas flows along the guide portion 41 and then rises through the space between the inner wall surface of the storage member 15 and the support member 30. Eventually, the fuel gas is discharged from the exhaust port (in the present embodiment, mainly the exhaust port 16a) to the outside of the fuel storage device 10.

It is noted that in the fuel tank 20 disposed at the end of the blocking member 40 in the flow direction of fuel gas (at the end in the +Y direction in FIG. 1) among one group of the fuel tanks 20 included in each tank group 25, the discharge direction of the fuel gas at the fusible plug valve 23 may be oriented closer to the side in the +Y direction than the end of the corresponding blocking member 40 in the +Y direction. That is, in the fuel tank 20 disposed at the above-mentioned end, the discharge direction of the fuel gas at the fusible plug valve 23 may be oriented outward with respect to the outer periphery of the blocking member 40. Thus, the fusible plug valve 23 that discharges the fuel gas more outward than the outer periphery of the blocking member 40 may be disposed not to overlap the blocking member 40 when viewing the blocking member 40 in the Z direction.

Furthermore, the blocking member 40 may be formed shortly not to allow the blocking member 40 to overlap the fusible plug valve 23 of the fuel tank 20 disposed on the other end (the end in the −Y direction in FIG. 1) of the group of fuel tanks 20 included in the respective tank groups 25, the other end being on a different side from the above-described end of the blocking member 40 in the flow direction of the fuel gas, when viewing the blocking member 40 in the Z direction. Even in this case, the orientation of the opening of the fusible plug valve in the fuel tank 20 disposed on the above-mentioned end in the −Y direction may be directed toward the blocking member 40.

It is noted that the angle formed by the discharge direction of the fuel gas in the above-mentioned fusible plug valve 23 relative to the surface of the blocking member is not necessarily the same among one group of the fuel tanks, constituting each tank group, but the discharge directions of the fuel gas from the fusible plug valves 23 are desirably tilted to the same side with respect to the direction perpendicular to the surface of the blocking member (tilted so as to form angles in the same angle range). That is, desirably, the discharge direction of the fuel gas from each of the fuel tanks in one group forms an angle of more than 0° and less than 90° with respect to the surface of the corresponding blocking member, or an angle of more than 90° and less than 180°. Thus, the fuel gas discharged from the respective fuel tanks in one group can flow in the certain direction along the blocking member without having the flows of the fuel gas interrupting each other.

To prevent the discharge direction of the fuel gas in the fusible plug valve 23 of the fuel tank 20 from being oriented to an adjacent fuel tank 20 in the same tank group, while suppressing the distance between adjacent fuel tanks 20 in the same tank group, when the above-mentioned angle is more than 0° and less than 90°, this angle is preferably, for example, 20° or more, and more preferably 30° or more. Alternatively, when the above-mentioned angle is more than 90° and less than 180°, this angle is preferably less than 160°, and more preferably less than 150°. To suppress the influence of the discharged hydrogen on the fuel tank 20 itself for discharging the fuel gas from the fusible plug valve 23, when the above-mentioned angle is more than 0° and less than 90°, this angle is preferably, for example, less than 80°, and more preferably less than 70°. Alternatively, when the above-mentioned angle is more than 90° and less than 180°, this angle is preferably 100° or more, and more preferably 110° or more.

When the fusible plug valve 23 of each fuel tank 20 is opened, the fuel tanks 20 are exposed to a temperature which is high enough to open the fusible plug valves 23, thereby increasing the temperature of the fuel gas, which is then discharged from the fusible plug valves 23. Subsequently, at least part of the discharged fuel gas is blocked by the blocking member 40. In this way, the discharged fuel gas is prevented from reaching another fuel tank 20 disposed adjacent to each fuel tank 20 in the group via the blocking member 40 (the other fuel tank being the adjacent, stacked fuel tank 20 included in another tank group 25, hereinafter also referred to as "juxtaposed tank"). The blocking member 40 may be formed of, for example, iron, carbon fiber, or a brick, as previously described. It is desirable that the blocking member 40 is formed especially of carbon fiber, from the viewpoint of its thermal insulating properties that reduce the heat transfer of the fuel gas, whose temperature is raised, to the adjacent juxtaposed tanks through the blocking member 40, the heat transfer thereof to the support member 30, and the like.

According to the fuel storage device 10 of the present embodiment configured as mentioned above, the orientations of the openings of the fusible plug valves 23 included in the fuel tanks 20 are directed toward the blocking member 40 disposed between each of the fuel tanks 20 and the juxtaposed tank, which is another fuel tank 20 adjacent to the corresponding fuel tanks 20. Thus, under a high-temperature environment in which the fusible plug valve 23 is opened, the fuel gas discharged from the fusible plug valve 23 can be prevented from reaching the above-mentioned juxtaposed tank. This makes it possible to suppress inconveniences caused by the exposure of the fuel tank to the fuel gas, specifically, the exposure of the fuel tank to the flow of fuel gas whose temperature is raised.

In the present embodiment, the plurality of fuel tanks 20 is arranged such that the longitudinal directions of the fuel tanks 20 are parallel to each other, and the tank groups 25, each including the plurality of fuel tanks 20 aligned along a first direction (Y direction) perpendicular to the longitudinal direction, are arranged so as to be stacked along a second direction (Z direction) perpendicular to the longitudinal direction and different from the first direction, as viewed in the longitudinal direction of the fuel tanks 20. With this arrangement, at least some of the plurality of fuel tanks included in the fuel storage device 10 may make it difficult to orient the discharge direction of fuel gas in the fusible plug valve 23 to the direction in which no adjacent fuel tank 20 is present. However, the above-mentioned effect of suppressing the exposure of the other adjacent fuel tanks 20 to the flow of the fuel gas can be drastically exhibited by arranging the blocking member 40 between the adjacent fuel tanks 20 and orienting the discharge direction of the fuel gas in the fusible plug valve 23 toward the blocking member 40.

In the present embodiment, each of the blocking members 40 is arranged such that it overlaps all the fusible plug valves 23 provided in the respective fuel tanks 20 in one group, from one fuel tank 20 on one end of the group in the Y direction to the other fuel tank 20 on the other end thereof in the Y direction among the fuel tanks 20 constituting the corresponding tank group, as viewed in the Z direction. With this configuration, when the fuel gas is discharged from the fusible plug valve 23, the discharged fuel gas may be quickly guided to the outer periphery of the blocking member 40 along the surface of the blocking member 40 and thus discharged to the outside of the fuel storage device. This suppresses a local increase in the concentration of the fuel gas within the fuel storage device when the fuel gas is discharged from the fusible plug valve 23, thereby easily ensuring the safety.

In particular, in the present embodiment, a resin tank is used as the fuel tank 20 for storing hydrogen. Resin material tends to decrease its strength and is susceptible to damage when exposed to a high temperature, compared to, for example, metal material. However, by applying the blocking member 40 of the present embodiment, the effect of suppressing the influence of the fuel gas on the fuel tanks 20 arranged in the direction of orientation of the opening of the fusible plug valve 23 can be significantly exhibited when hydrogen whose temperature is raised is discharged from the fusible plug valve 23. It is noted that a tank made of any material other than resin may be used as the fuel tanks 20 for storing hydrogen. For example, the previously described liner included in the fuel tank 20 may be formed of a metal such as aluminum, instead of a resin. Alternatively, the fuel tank 20 may be formed of a metal such as stainless steel or an 'aluminum alloy.

B. Second Embodiment:

FIG. 3 is an explanatory diagram illustrating a schematic configuration of a fuel storage device 110 as a second embodiment of the present disclosure. The fuel storage device 110 of the second embodiment is used in the same manner as the fuel storage device 10 of the first embodiment, and components that are in common to the fuel storage device 10 of the first embodiment are denoted by the same reference characters.

The fuel storage device 110 of the second embodiment differs from that of the first embodiment in the form of the fuel tanks 20 arranged to be aligned in the Y direction and the Z direction. In the second embodiment, three tank groups 25, each group being composed of fuel tanks aligned in the Y direction, are arranged to be stacked in three stages in the Z direction. Each of the first tank group 25c from the bottom and the third tank group 25a from the bottom has four fuel tanks 20 arranged in the Y direction, while the second tank group 25b from the bottom has five fuel tanks 20 arranged in the Y direction. The boundary between the frame bodies 36 adjacent to each other in the Y direction is displaced in the Y direction for each of the tank groups 25 adjacent in the Z direction.

Also in the fuel storage device 110 of the second embodiment, as in the first embodiment, the blocking members (blocking members 40a, 40b, and 40c in that order from top) 40 are arranged one for each tank group 25, each tank group being composed of the fuel tanks 20 arranged to be aligned in the Y direction. Each fuel tank 20 is arranged such that the orientation of the opening of the fusible plug valve 23 (the discharge direction of the fuel gas) of the fuel tank 20 is tilted to the same side in the group 25 with respect to the direction perpendicular to the surface of the corresponding blocking member 40 as viewed in the X direction. Even with this configuration, by providing the blocking members 40, the same effects as those of the first embodiment are obtained when the fuel gas is discharged from the fusible plug valves 23.

Figure 4:
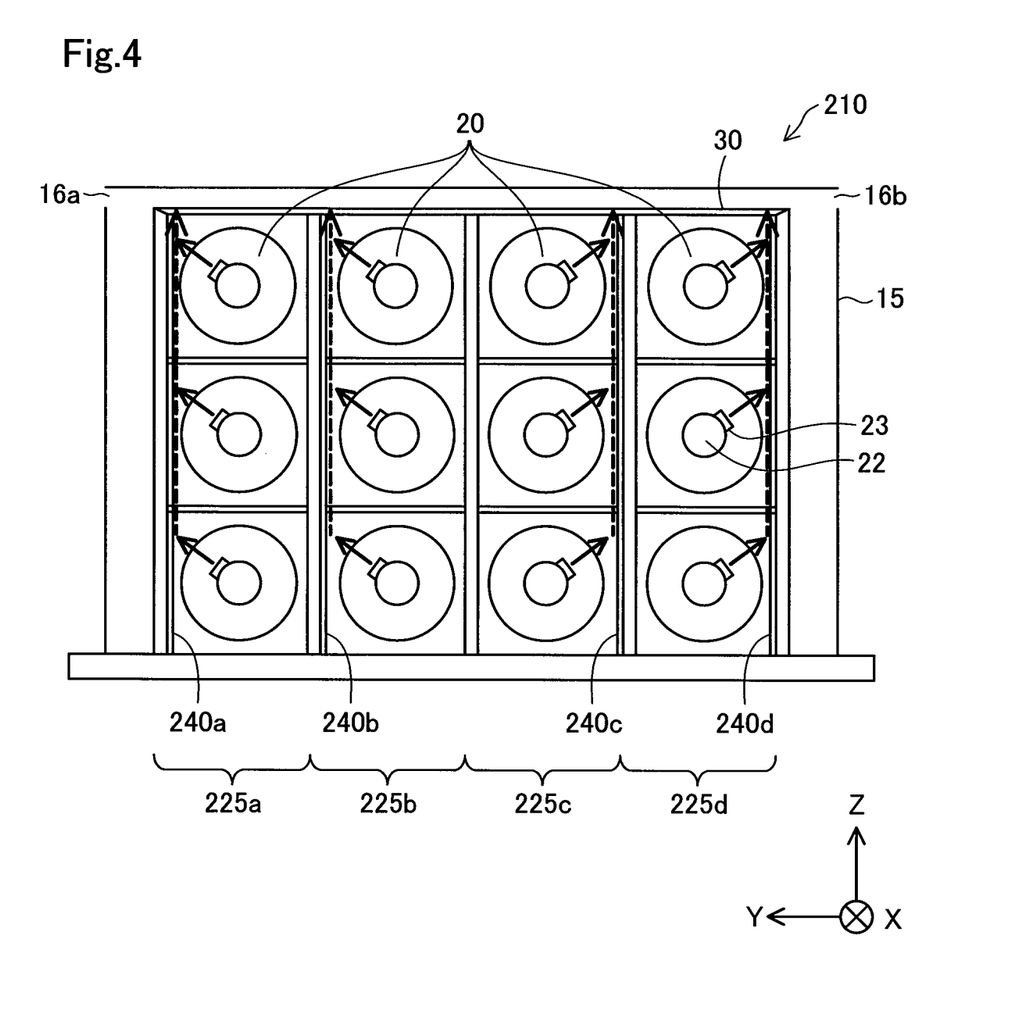
FIG. 4 is an explanatory diagram illustrating a schematic configuration of a fuel storage device.

C. Third Embodiment :

FIG. 4 is an explanatory diagram illustrating a schematic configuration of a fuel storage device 210 as a third embodiment of the present disclosure. The fuel storage device 210 of the third embodiment is used in the same manner as the fuel storage device 10 of the first embodiment, and components that are in common to the fuel storage device 10 of the first embodiment are denoted by the same reference characters.

In the fuel storage device 210 of the third embodiment, four tank groups 225a to 225d, each group being composed of three fuel tanks 20 stacked in the Z direction, are arranged to be aligned in four columns in the Y direction. The fuel tanks 20 and the frame bodies 36 that accommodate the fuel tanks 20 are disposed so as to overlap in the Y direction as well as the Z direction. In such a fuel storage device 210 of the third embodiment, blocking members 240a to 240d are provided for the tank groups 225a to 225d, respectively, each tank group being composed of three fuel tanks 20 stacked in the Z direction. Further, the blocking members 240a to 240d are arranged such that their longitudinal directions are aligned with the Z direction. The fuel tanks 20 are arranged such that the orientation of the opening of the fusible plug valve 23 (the discharge direction of the fuel gas) in each fuel tank 20 constituting any of the tank groups is tilted to the same side with respect to the direction perpendicular to the surface of a corresponding one of the blocking members 240a to 240d as viewed in the X direction. Specifically, the orientation of the above-mentioned opening is tilted with respect to the surface of the corresponding one of the blocking members 240a to 240d so that the fuel gas discharged from the fusible plug valve 23 has its flow direction changed upward (in the +Z direction). In such a fuel storage device 210, the fuel gas discharged from the fusible plug valve 23 of each fuel tank 20 toward the opposing one of the blocking members 240a to 240d is guided in the +Z direction (upward) along the surface of each of the blocking members 240a to 240d and then discharged from each or one of the exhaust ports 16a and 16b provided at the upper end portions of the storage member 15.

For example, when the storage member 15 is exposed to high temperature and melted, it may not be desirable for the fuel gas, which is guided to the surface of the blocking member after being discharged from the fusible plug valve 23, to flow out in the X direction or Y direction (horizontal direction) at the end portion of the blocking member, unlike the first embodiment. In such a case, the direction in which the fuel gas discharged from one group of fuel tanks 20 collectively flows out of the end portion of the blocking member may be set as needed by appropriately setting the direction in which the blocking member is arranged, as well as the orientation of the opening of the fusible plug valve 23 as described above. Even with this configuration, by providing the blocking members 240a to 240d, the same effects as those of the first embodiment are obtained when the fuel gas is discharged from the fusible plug valves 23.

D. Other Embodiments (D1) In each of the above-mentioned embodiments, the blocking members 40 are provided for all tank groups, each tank group being composed of fuel tanks 20 arranged to be aligned in line, but a different configuration may be adopted. For example, no blocking member 40 may be provided for the outermost tank group (for example, the tank group 25a in FIG. 1) arranged on the outermost side, among the plurality of tank groups, and the orientation of the opening of the fusible plug valve 23 in each of the fuel tanks 20 constituting this outermost tank group may be directed to where none of the plurality of fuel tanks 20 included in the fuel storage device is present. Specifically, the blocking member 40a in the fuel storage device of FIG. 1, FIG. 3, or FIG. 6 as described below, or the blocking member 240a and the blocking member 240d in the fuel storage device 210 of FIG. 4 may not be provided.

In this case, from each fuel tank 20 included in the above-mentioned outermost tank group, the fuel gas is discharged without being interrupted by the blocking member 40 when the fusible plug valve 23 is opened. Even in such a case, the fuel gas discharged from each of the fuel tanks 20 included in the above-mentioned outermost tank group is directed not toward an adjacent fuel tank 20, but toward an area where no fuel tank 20 is present. Meanwhile, by providing the blocking members 40 in the tank groups other than the above-mentioned outermost tank group, the discharged fuel gas therefrom is prevented from reaching the juxtaposed tank, which is an adjacent fuel tank 20, thereby making it possible to obtain the same effects as those of the respective embodiments previously described.

It is necessary to dispose the blocking member 40 between the tank group including a plurality of fuel tanks 20 which are some of the plurality of fuel tanks 20 included in the fuel storage device and the juxtaposed tank adjacent to this tank group; the fuel tanks 20 of this tank group are aligned in the first direction perpendicular to the longitudinal direction of the fuel tank 20. In addition, among the fuel tanks 20 included in the above-mentioned tank group, the discharge direction of the fuel gas in each of the fusible plug valves 23 included in two or more fuel tanks 20 continuously arranged in the first direction only needs to be oriented toward the corresponding blocking member 40. The fuel tank 20 having the fusible plug valve 23 whose opening orientation is directed toward the above-mentioned blocking member 40, among the fuel tanks 20 included in the above tank group, is also referred to as a "blocked tank".

(D2) In the fuel storage device of each of the above-mentioned embodiments, a plurality of tank groups, each tank group including the plurality of fuel tanks 20 aligned along the first direction perpendicular to the longitudinal direction, is arranged so as to be stacked along the second direction perpendicular to the longitudinal direction and different from the first direction as viewed in the longitudinal direction, and the blocking member 40 is disposed between adjacent tank groups. However, a different configuration may be adopted. For example, instead of the other tank group including a plurality of fuel tanks 20, a single juxtaposed tank may be disposed on the back surface side of the blocking member 40, which is opposite to the surface of the blocking member 40 facing the above-mentioned tank group.

Figure 5:
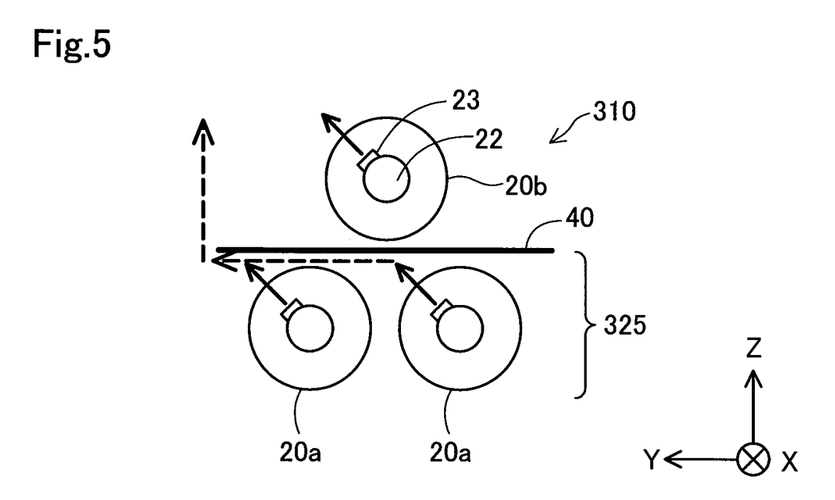
FIG. 5 is an explanatory diagram illustrating a schematic configuration of a fuel storage device as another embodiment.

FIG. 5 is an explanatory diagram illustrating a schematic configuration of a fuel storage device 310 as such another embodiment. The fuel storage device 310 of the other embodiment illustrated in FIG. 5 is used in the same manner as the fuel storage device 10 of the first embodiment. FIG. 5 illustrates the flow of the fuel gas in the same manner as FIG. 1 while denoting components that are in common to the fuel storage device 10 of the first embodiment by the same reference characters. FIG. 5 omits the illustration of the support member 30 and the storage member 15, but illustrates the positional relationship among respective fuel tanks 20, the directions of the fusible plug valves 23, and the blocking member 40.

In the fuel storage device 310, a tank group 325 arranged in the −Z direction with respect to the blocking member 40 includes two fuel tanks 20a as the blocked tanks having the fusible plug valves 23 whose openings are directed toward the blocking member 40. Meanwhile, a single fuel tank 20b is provided in the +Z direction with respect to the blocking member 40, as the juxtaposed tank arranged to be aligned in the second direction different from the first direction (Y direction) with respect to any of the fuel tanks 20a. Even with this configuration, by providing the blocking member 40, the same effects as those of the first embodiment are obtained when the fuel gas is discharged from the fusible plug valves 23 of the fuel tanks 20a which are the blocked tanks.

(D3) In the fuel storage device of each of the above-mentioned embodiments, the blocking member 40 is individually provided for each tank group composed of the plurality of fuel tanks 20, which are arranged to be aligned in one line in one direction, and thereby the discharged fuel gas is received only on one surface of the individual blocking member 40, but a different configuration may be adopted. For example, the blocking member 40 arranged between adjacent tank groups 25 may receive, on one surface thereof, the fuel gas discharged from one of the adjacent tank groups, and may also receive on the other surface thereof, the fuel gas discharged from the other of the adjacent tank groups. From the viewpoint of suppressing a local increase in the concentration of the fuel gas within the fuel storage device, it is desirable to provide the blocking member 40 for each tank group and to receive the fuel gas discharged from the fusible plug valve 23 only on one surface of each blocking member 40.

(D4) Although the fuel storage device of each of the above-mentioned embodiments includes the storage member 15, the storage member 15 may not be provided. However, it is desirable to provide the storage member 15 because it can prevent the leaking fuel gas from flowing out in an undesired direction when the fuel gas leaks out of the fuel tanks 20 included in the fuel storage device.

(D5) In each of the above-mentioned embodiments, the fuel storage device is provided as a part of a stationary power supply including a fuel cell and used to install a fuel tank 20 for storing fuel gas to be supplied to the fuel cell, but it may be used for different applications. Hereinafter, a description will be given on a configuration in which a fuel storage device 410 as another embodiment is mounted on a vehicle 400.

Figure 6:
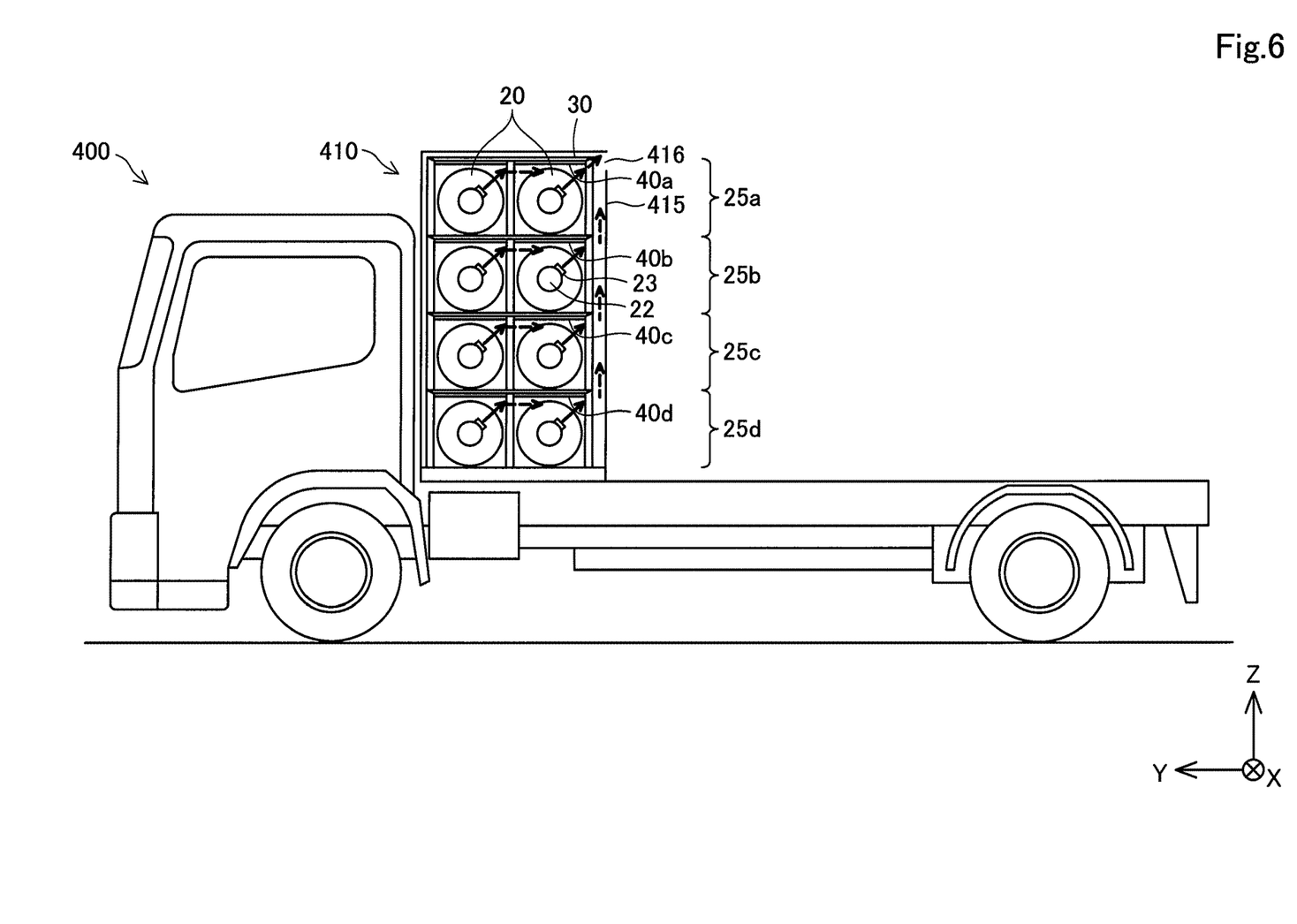
FIG. 6 is an explanatory diagram illustrating a schematic configuration of a vehicle on which the fuel storage device is mounted.

FIG. 6 is an explanatory diagram illustrating a schematic configuration of the vehicle 400 that mounts thereon the fuel storage device 410 as the other embodiment of the present disclosure. In the fuel storage device 410, components that are in common to the fuel storage device 10 of the first embodiment are denoted by the same reference characters. The number of fuel tanks 20 arranged in the Y and Z directions can be set to any plural number, and any of the fuel storage devices of the embodiments described previously may also be used. However, in the fuel storage device 310 of FIG. 6, four tank groups 25a to 25d, each group including two fuel tanks 20 aligned in the Y direction, are arranged so as to be stacked in four stages in the Z direction. The blocking members (blocking members 40a, 40b, 40c, and in that order from top) 40, each having its longitudinal direction in the Y direction, are disposed one for each tank group 25. As in the first embodiment, each fuel tank 20 is arranged in such a way that the orientation of the opening of the fusible plug valve 23 is tilted in the same direction common to each tank group 25 with respect to the surface of the corresponding blocking member 40. When the fusible plug valves 23 are opened, the fuel gas is discharged from the fusible plug valves 23 toward the blocking members 40a to 40d, and the fuel gas guided to each of the blocking members 40a to 40d is discharged from an exhaust port 416 to the outside of the storage member 415.

The vehicle 400 on which the fuel storage device 410 is mounted as described above can be, for example, a fuel cell vehicle on which a fuel cell is mounted as a power source for driving the vehicle 400. In this case, the fuel storage device 410 is used to mount the fuel tank 20, which stores fuel gas to be supplied to the above fuel cell, on the vehicle 400. Alternatively, the vehicle 400 may be a power supply vehicle which supplies electric power generated by a fuel cell to an external device or the like outside the vehicle 400, instead of the vehicle on which the fuel cell serving as a power source for driving the vehicle 400 is mounted.

The fuel storage device may be configured to be used for any purposes other than installation of a fuel tank to store fuel gas which is to be supplied to an energy generator, such as a fuel cell, by being provided together with the energy generator. For example, the fuel storage device may be used to dispose a plurality of fuel tanks 20 in a transport vehicle for mounting and transporting a plurality of fuel tanks 20. The fuel storage device may be used in a stationary facility or may be used when mounted on a mobile body. In other words, the fuel storage device is used in various applications for disposing a plurality of fuel tanks.

(D6) In each of the above-mentioned embodiments, hydrogen is used as the fuel gas stored in the fuel tank 20 included in the fuel storage device, but a different configuration may be adopted. For example, the configuration that uses the blocking member described based on each embodiment is applicable to any other devices installing a tank which may store various flammable fuel gases other than hydrogen.

The disclosure is not limited to any of the embodiment and its modifications described above but may be implemented by a diversity of configurations without departing from the scope of the disclosure. For example, the technical features of any of the above embodiments and their modifications may be replaced or combined appropriately, in order to solve part or all of the problems described above or in order to achieve part or all of the advantageous effects described above. Any of the technical features may be omitted appropriately unless the technical feature is described as essential in the description hereof. The present disclosure may be implemented by aspects described below.

(1) According to an aspect of the present disclosure, a fuel storage device is provided. The fuel storage device includes: a plurality of fuel tanks configured to store fuel gas, each of the fuel tanks having a fusible plug valve from which the fuel gas is discharged under a predetermined high temperature condition; a support member configured to support the plurality of fuel tanks, while making longitudinal directions of the respective plurality of fuel tanks parallel to each other and setting an orientation of an opening of the fusible plug valve provided in each of the fuel tanks, in a predetermined direction; and a blocking member configured to block at least part of the fuel gas discharged from the fusible plug valve. The plurality of fuel tanks includes: a tank group including the plurality of fuel tanks aligned along a first direction perpendicular to the longitudinal direction as viewed in the longitudinal direction; and a juxtaposed tank arranged to be aligned in a second direction different from the first direction with respect to any of the fuel tanks included in the tank group. The blocking member is disposed between the tank group and the juxtaposed tank. The orientations of the openings of the fusible plug valves included in blocked tanks are directed toward the blocking member, the blocked tanks being two or more of the fuel tanks included in the tank group and being continuously arranged in the first direction.

According to the fuel storage device of this aspect, the orientation of the opening of the fusible plug valve which is provided in each of the blocked tanks included in the tank group is directed toward the blocking member disposed between above-mentioned tank group and the juxtaposed tank. Thus, even when fuel gas is discharged from the fusible plug valve included in the above-mentioned blocked tank, at least part of the discharged fuel gas can be blocked by the blocking member and thereby prevented from reaching the juxtaposed tank which is another fuel tank. As a result, the inconvenience, such as exposure of the fuel tank, whose temperature is raised, to the fuel gas can be suppressed under a high-temperature environment in which the fusible plug valve is opened.

(2) In the fuel storage device of the above-mentioned aspect, the blocked tanks may be all the fuel tanks included in the tank group.

According to the fuel storage device of this aspect, the fuel gas discharged from the fusible plug valve can be prevented from reaching the juxtaposed tank among all the fuel tanks included in the tank group.

(3) In the fuel storage device of the above-mentioned aspect, the blocked tanks may be the fuel tanks except for a fuel tank disposed on at least one end of the tank group in the first direction, among the fuel tanks included in the tank group.

According to the fuel storage device of this aspect, by directing the orientation of the opening of the fusible plug valve toward the blocking member, the blocked tanks can prevent the fuel gas discharged from the fusible plug valve from reaching the juxtaposed tank.

(4) In the fuel storage device of the above-mentioned aspect, the orientation of the opening of the fusible plug valve included in a fuel tank other than the blocked tanks among the fuel tanks included in the tank group may be directed to where none of the plurality of fuel tanks included in the fuel storage device is present.

According to the fuel storage device of this aspect, the fuel gas discharged from the fusible plug valve can be prevented from reaching the juxtaposed tank while suppressing the complexity of the structure of the fuel storage device that is caused by the provision of the blocking member.

(5) In the fuel storage device of the above-mentioned aspect, the blocking member may be provided to extend in the first direction, and further the blocking member may be disposed to overlap all the fusible plug valves included in the respective blocked tanks as viewed in a direction perpendicular to the first direction and different from the longitudinal direction.

According to the fuel storage device of this aspect, when the fuel gas is discharged from the fusible plug valve, the discharged fuel gas may be quickly guided to the outer periphery of the blocking member along the surface of the blocking member and thus discharged to the outside of the fuel storage device. This makes it possible to suppress a local increase in the concentration of the fuel gas within the fuel storage device when the fuel gas is discharged from the fusible plug valve, which enhances the safety.

(6) In the fuel storage device of the above-mentioned aspect, the orientation of the opening of the fusible plug valve included in each of the blocked tanks may form an angle of more than 0° and less than 90°, or an angle of more than 90° and less than 180° with respect to a surface of the blocking member.

According to the fuel storage device of this aspect, the orientations of the openings of the fusible plug valves included in the respective plurality of fuel tanks in the tank group are tilted to the same side with respect to the direction perpendicular to the surface of the blocking member. Thus, the fuel gas discharged from the respective plurality of fuel tanks included in the tank group can flow in a certain direction along the surface of the blocking member without having the flows of the fuel gas interrupting each other.

The present disclosure is also able to be realized by various forms other than the above-mentioned fuel storage devices. For example, the present disclosure may be realized in the form of a fuel cell vehicle on which the fuel storage device and a fuel cell that generates electricity using the fuel gas are mounted, a power supply apparatus on which the fuel storage device and a fuel cell that generates electricity using the fuel gas are mounted, and the like.

What is claimed is:

1. A fuel storage device, comprising:
a plurality of fuel tanks, wherein each of the fuel tanks is configured to store fuel gas, wherein each of the fuel tanks has a fusible plug valve configured to discharge the fuel gas from the fuel tank under a predetermined high temperature condition;
a support member configured to support the plurality of fuel tanks so that longitudinal directions of the respective plurality of fuel tanks are parallel to each other, wherein the plurality of fuel tanks are supported by the support member so that an orientation of an opening of the fusible plug valve provided in each of the fuel tanks is in a predetermined direction; and a blocking member configured to block at least part of the fuel gas discharged from the opening of the fusible plug valve, wherein the plurality of fuel tanks includes a first tank group and a second tank group, wherein the first tank group includes two or more fuel tanks of the plurality of fuel tanks aligned along a first direction, wherein the first direction is perpendicular to the longitudinal direction, wherein the second tank group includes the fuel tanks arranged in a second direction with respect to any of the fuel tanks included in the first tank group, wherein the second direction is different from the first direction, wherein the blocking member is disposed between the first tank group and the second tank group, and wherein the first tank group includes two or more blocked tanks arranged next to each other, wherein the blocked tank is the fuel tank in which the opening of the fusible plug valve is oriented toward the blocking member.

2. The fuel storage device according to claim 1, wherein the blocked tanks are all the fuel tanks included in the first tank group.

3. The fuel storage device according to claim 1, wherein the blocked tanks are the fuel tanks except for a fuel tank disposed on at least one end of the tank group in the first direction, among the fuel tanks included in the tank group.

4. The fuel storage device according to claim 3, wherein the orientation of the opening of the fusible plug valve included in a fuel tank other than the blocked tanks among the fuel tanks included in the tank group is directed to where none of the plurality of fuel tanks included in the fuel storage device is present.

5. The fuel storage device according to claim 1, wherein the blocking member is provided to extend in the first direction, and wherein the blocking member is disposed to overlap all the fusible plug valves included in the respective blocked tanks as viewed in a direction perpendicular to the first direction and different from the longitudinal direction.

6. The fuel storage device according to claim 5, wherein the orientation of the opening of the fusible plug valve included in each of the blocked tanks forms an angle of more than 0° and less than 90° or an angle of more than 90° and less than 180° with respect to a surface of the blocking member.

* * * * *